US011938593B2

(12) United States Patent
Kondo

(10) Patent No.: US 11,938,593 B2
(45) Date of Patent: Mar. 26, 2024

(54) IMPACT TOOL

(71) Applicant: MAKITA CORPORATION, Anjo (JP)

(72) Inventor: Tomoyuki Kondo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 7 days.

(21) Appl. No.: 17/849,179

(22) Filed: Jun. 24, 2022

(65) Prior Publication Data

US 2023/0043704 A1 Feb. 9, 2023

(30) Foreign Application Priority Data

Aug. 6, 2021 (JP) ................................ 2021-129436

(51) Int. Cl.
*B25B 21/02* (2006.01)

(52) U.S. Cl.
CPC .................................... *B25B 21/02* (2013.01)

(58) Field of Classification Search
CPC ....... B25B 21/02; B25B 21/026; B25B 21/00; B25B 21/023; B25B 23/1475; B25B 23/1405; B25B 23/1453; B25D 11/04
See application file for complete search history.

(56) References Cited

U.S. PATENT DOCUMENTS 5,217,079 A * 6/1993 Kettner ................... B25B 21/02 91/59
6,782,956 B1 * 8/2004 Seith ..................... B25B 21/026 173/206
7,131,503 B2 * 11/2006 Furuta .................. B25D 16/006 173/112
2006/0090913 A1 * 5/2006 Furuta .................. B25D 16/003 173/48
2006/0254786 A1 * 11/2006 Murakami .............. B25B 21/02 173/93.5
2006/0254789 A1 * 11/2006 Murakami .............. B25F 5/006 173/128
2007/0034398 A1 * 2/2007 Murakami .............. B25B 21/02 173/128
2009/0223690 A1 * 9/2009 Sugimoto ............. B25B 21/026 173/48
2012/0322605 A1 * 12/2012 Hirabayashi ............ B25B 21/02 475/149
2015/0041169 A1 * 2/2015 Kumagai ............... B25D 17/26 173/93.7

(Continued)

FOREIGN PATENT DOCUMENTS

JP 2015-033738 A 2/2015

*Primary Examiner* — Dariush Seif
(74) *Attorney, Agent, or Firm* — Oliff PLC

(57) ABSTRACT

A technique reduces an increase in the size of an impact tool. An impact tool includes a motor, a striker drivable by the motor, an anvil including an anvil shaft to receive a tip tool, and an anvil projection protruding radially outward from a rear end of the anvil shaft to be struck by the striker in a rotation direction, a hammer case accommodating the striker, a bearing held in the hammer case and surrounding the anvil shaft, a ring member at least partially facing a front surface of the anvil projection and in contact with a rear end face of the bearing, and a stopper engaging with the hammer case and the ring member to reduce moving of the ring member rearward.

20 Claims, 6 Drawing Sheets

(56) References Cited

U.S. PATENT DOCUMENTS

| | | | | |
|---|---|---|---|---|
| 2016/0075004 | A1* | 3/2016 | Tsubakimoto | B25B 21/026<br>173/93 |
| 2017/0165817 | A1* | 6/2017 | Vogt | B25B 21/026 |
| 2019/0160636 | A1* | 5/2019 | Hirabayashi | B25D 16/006 |
| 2019/0262978 | A1* | 8/2019 | Tejima | B25B 21/026 |
| 2020/0215668 | A1* | 7/2020 | Duncan | B25B 23/0007 |
| 2020/0215678 | A1* | 7/2020 | Nakashima | B25F 5/006 |
| 2020/0269407 | A1* | 8/2020 | Kawai | B25D 16/00 |
| 2021/0016428 | A1* | 1/2021 | Nakashima | B25B 21/00 |
| 2021/0023629 | A1* | 1/2021 | Kawai | B25B 23/0035 |
| 2021/0060741 | A1* | 3/2021 | Kusumoto | B25F 5/02 |
| 2021/0162571 | A1* | 6/2021 | Kondo | B25B 21/02 |
| 2021/0260734 | A1* | 8/2021 | Kubale | B25B 21/02 |
| 2021/0283762 | A1* | 9/2021 | Kusumoto | H02K 5/225 |
| 2022/0040829 | A1* | 2/2022 | Schneider | B25B 21/02 |
| 2023/0043704 | A1* | 2/2023 | Kondo | B25B 21/02 |

* cited by examiner

IMPACT TOOL

CROSS-REFERENCE TO RELATED APPLICATIONS

This application claims the benefit of priority to Japanese Patent Application No. 2021-129436, filed on Aug. 6, 2021, the entire contents of which are hereby incorporated by reference.

BACKGROUND

1. Technical Field

The present disclosure relates to an impact tool.

2. Description of the Background

In the field of impact tools, a known impact tool is described in Japanese Unexamined Patent Application Publication No. 2015-033738.

BRIEF SUMMARY

For improved operability of an impact tool, a technique is awaited for reducing an increase in the size of the impact tool.

One or more aspects of the present disclosure are directed to reducing an increase in the size of an impact tool.

A first aspect of the present disclosure provides an impact tool, including:

a motor;

a striker drivable by the motor;

an anvil including an anvil shaft to receive a tip tool, and an anvil projection protruding radially outward from a rear end of the anvil shaft to be struck by the striker in a rotation direction;

a hammer case accommodating the striker;

a bearing held in the hammer case and surrounding the anvil shaft;

a ring member at least partially facing a front surface of the anvil projection and in contact with a rear end face of the bearing; and a stopper engaging with the hammer case and the ring member to reduce moving of the ring member rearward.

The technique according to the above aspect of the present disclosure reduces an increase in the size of an impact tool.

DETAILED DESCRIPTION

One or more embodiments will now be described with reference to the drawings. In the embodiments, the positional relationships between the components will be described using the directional terms such as right and left (or lateral), front and rear (or forward and backward), and up and down. The terms indicate relative positions or directions with respect to the center of an impact tool 1. The impact tool 1 includes a motor 6 as a power supply.

In the embodiments, a direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX extends in a front-rear direction. The axial direction is from the rear to the front (first axial direction) or from the front to the rear (second axial direction). A position nearer the rotation axis AX in the radial direction, or a radial direction toward the rotation axis AX, is referred to as radially inside or radially inward for convenience. A position farther from the rotation axis AX in the radial direction, or a radial direction away from the rotation axis AX, is referred to as radially outside or radially outward for convenience.

Impact Tool

Figure 1:
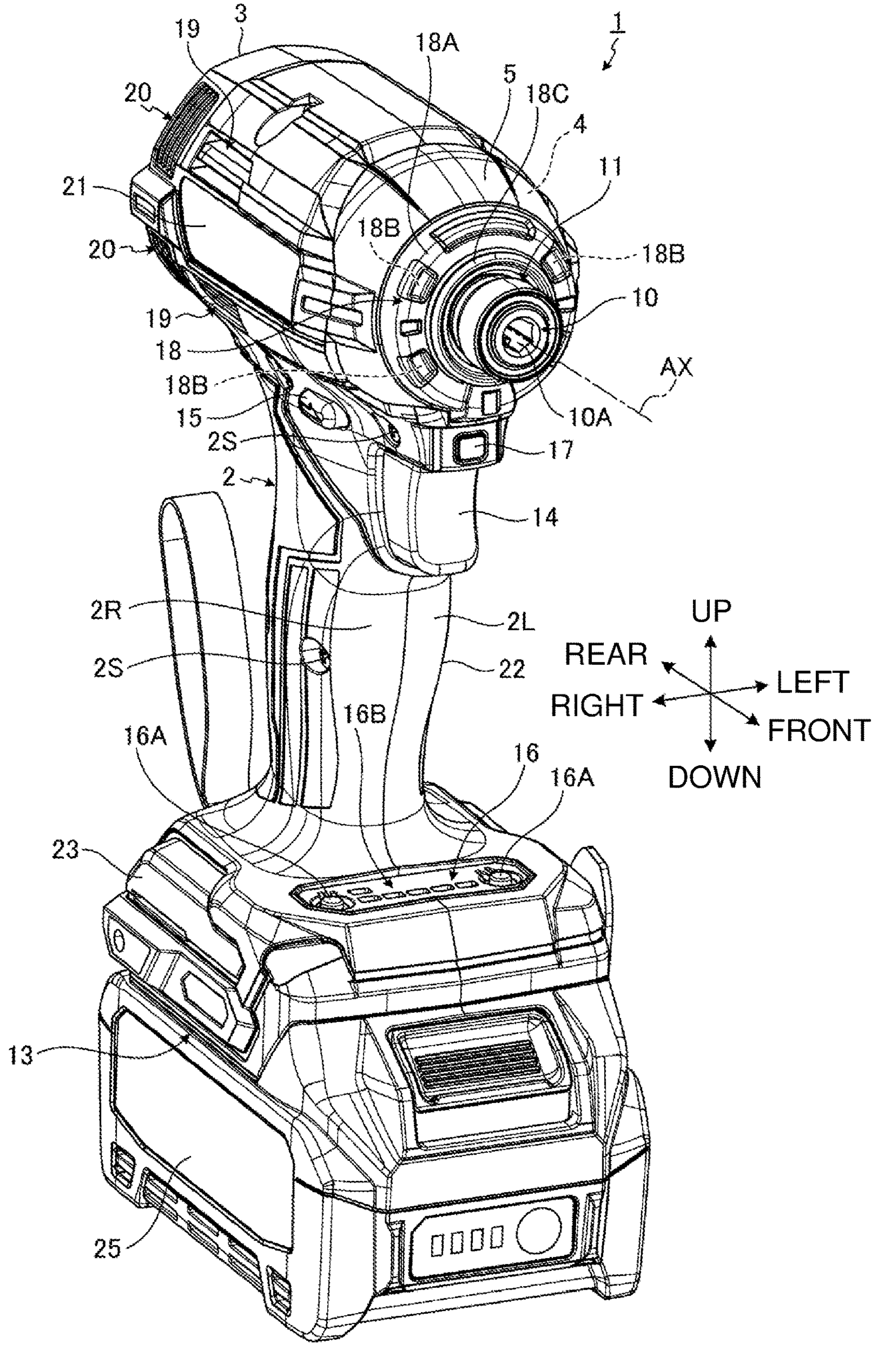
FIG. 1 is a perspective view of an impact tool according to an embodiment as viewed from the front.
Figure 2:
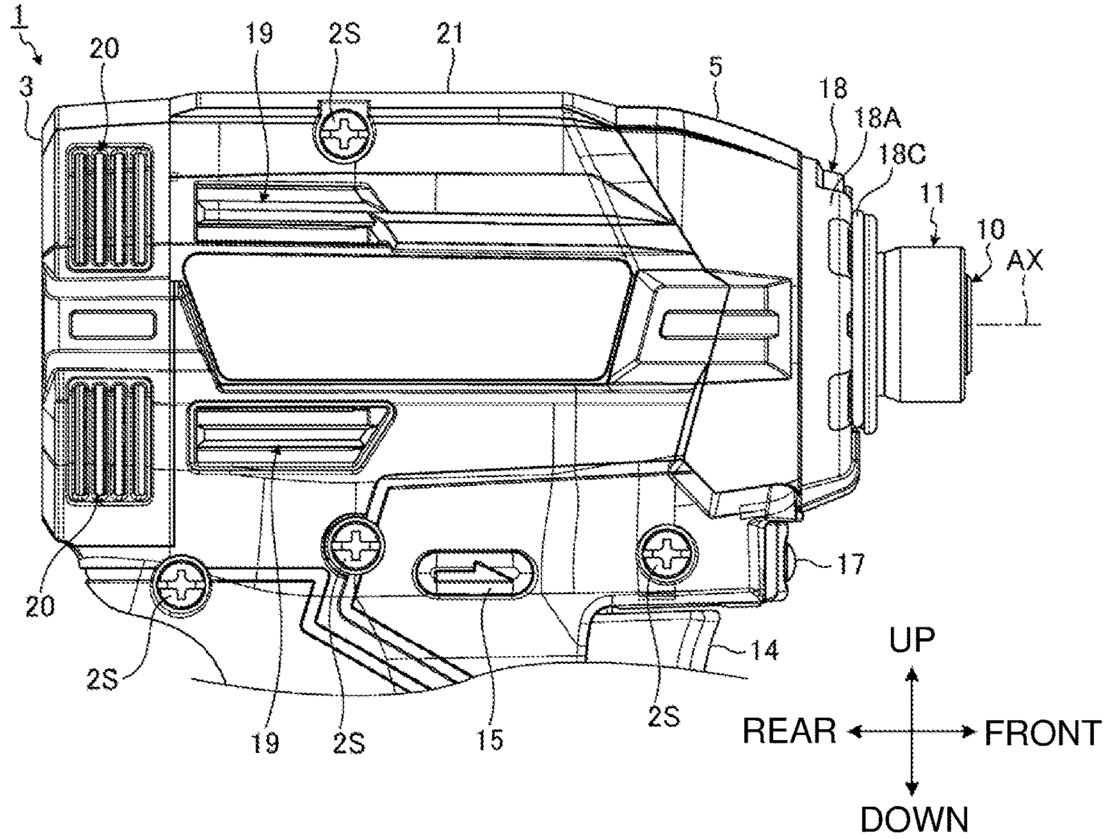
FIG. 2 is a side view of an upper portion of the impact tool according to the embodiment.
Figure 3:
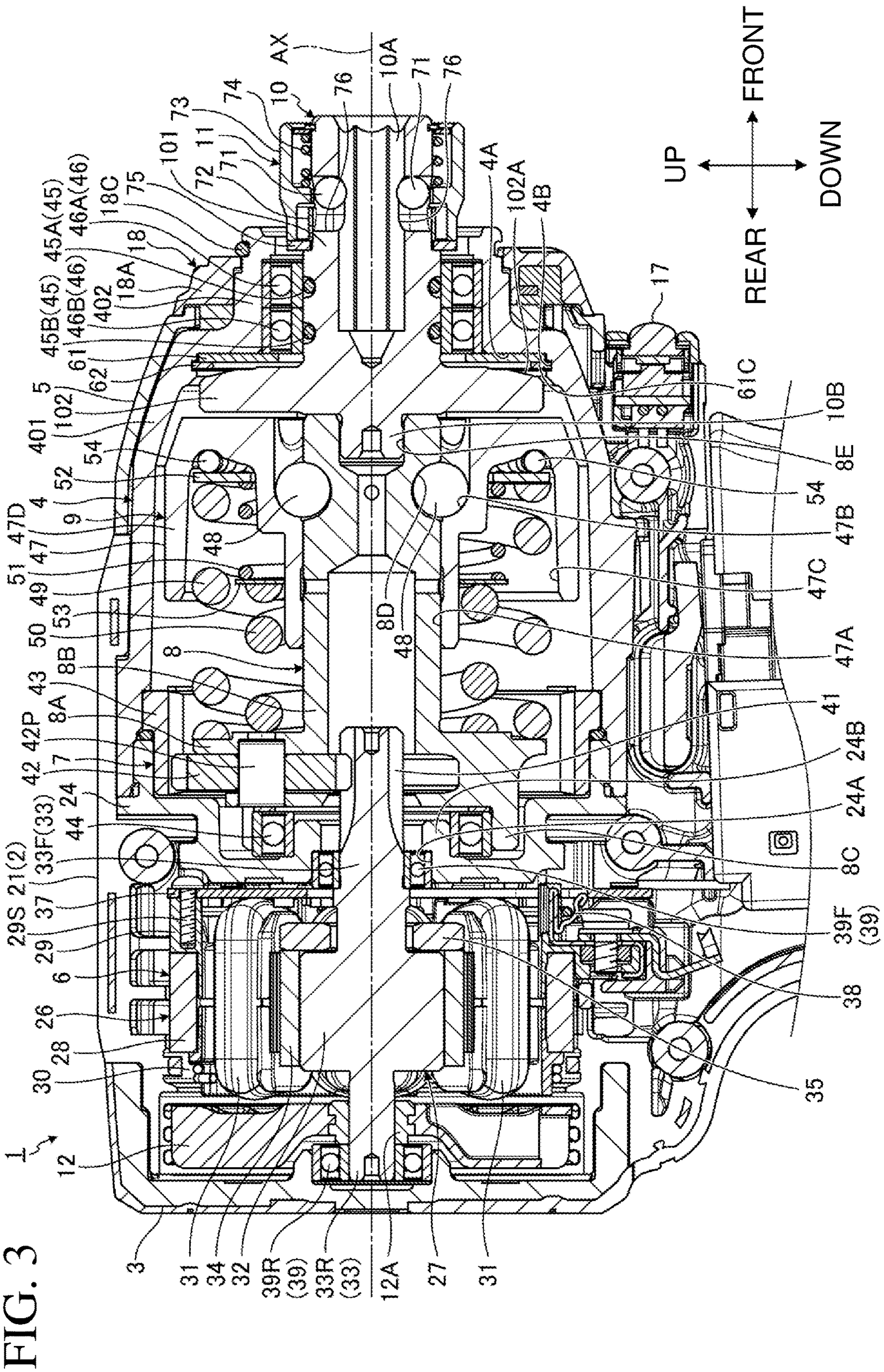
FIG. 3 is a longitudinal sectional view of the upper portion of the impact tool according to the embodiment.
Figure 4:
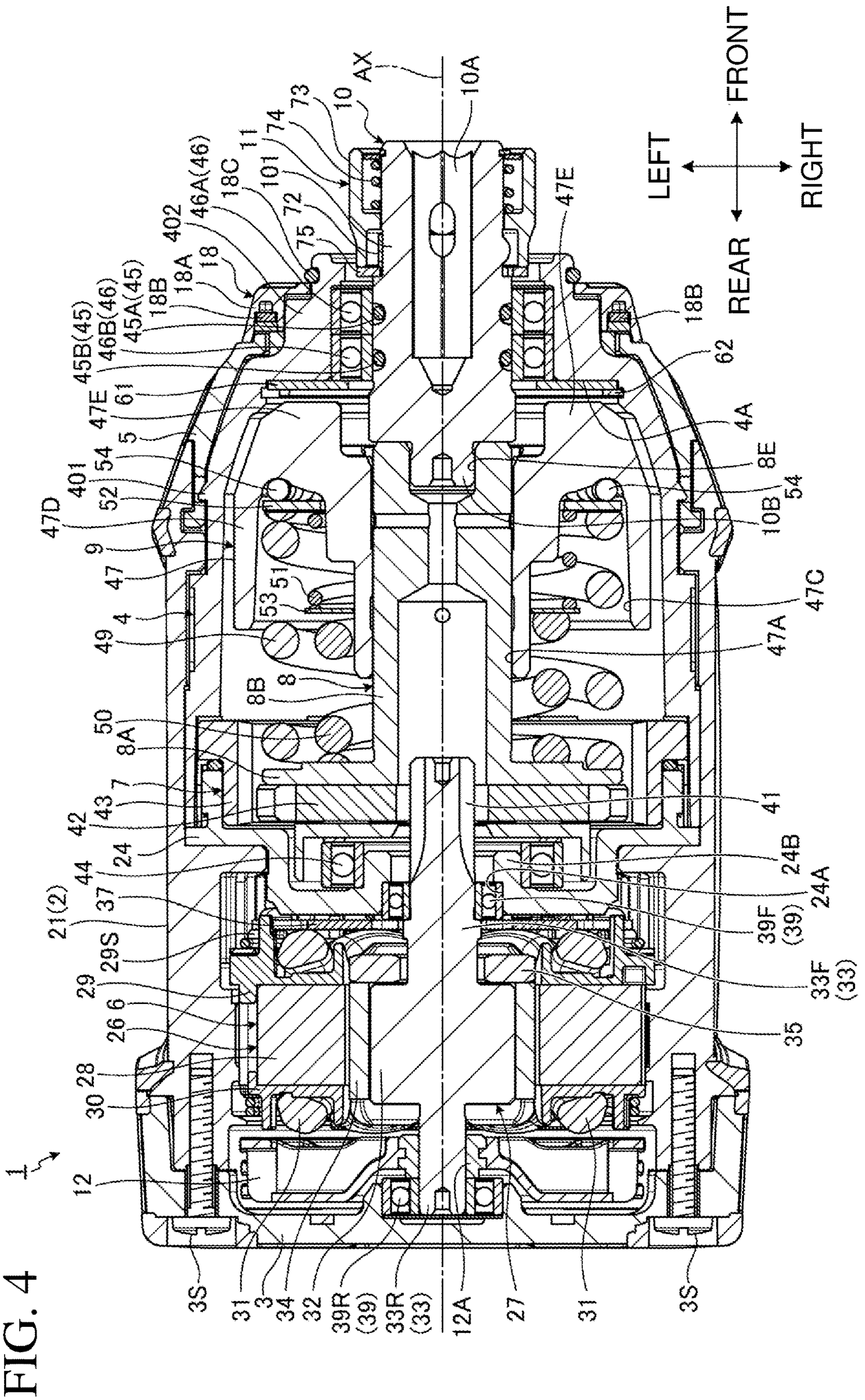
FIG. 4 is a horizontal sectional view of the upper portion of the impact tool according to the embodiment.

FIG. 1 is a perspective view of the impact tool 1 according to an embodiment as viewed from the front. FIG. 2 is a side view of an upper portion of the impact tool 1 according to the embodiment. FIG. 3 is a longitudinal sectional view of the upper portion of the impact tool 1 according to the embodiment. FIG. 4 is a horizontal sectional view of the upper portion of the impact tool 1 according to the embodiment.

The impact tool 1 according to the embodiment is an impact driver that is a screwing machine. The impact tool 1 includes a housing 2, a rear cover 3, a hammer case 4, a hammer case cover 5, a motor 6, a reducer 7, a spindle 8, a striker 9, an anvil 10, a tool holder 11, a fan 12, a battery mount 13, a trigger lever 14, a forward-reverse switch lever 15, an operation display 16, a mode switch 17, and a light assembly 18.

The housing 2 is formed from a synthetic resin. The housing 2 in the embodiment is formed from nylon. The housing 2 includes a left housing 2L and a right housing 2R. The right housing 2R is located on the right of the left housing 2L. The left and right housings 2L and 2R are fastened together with multiple screws 2S. The housing 2 includes a pair of housing halves.

The housing 2 includes a motor compartment 21, a grip 22, and a battery holder 23.

The motor compartment 21 is cylindrical. The motor compartment 21 accommodates the motor 6. The motor compartment 21 accommodates at least a part of the hammer case 4.

The grip 22 extends downward from the motor compartment 21. The trigger lever 14 is located in an upper portion of the grip 22. The grip 22 is gripped by an operator.

The battery holder 23 is connected to a lower end of the grip 22. The battery holder 23 has larger outer dimensions than the grip 22 in the front-rear and lateral directions.

The rear cover 3 is formed from a synthetic resin. The rear cover 3 is located behind the motor compartment 21. The rear cover 3 accommodates at least a part of the fan 12. The fan 12 is located circumferentially inward from the rear cover 3. The rear cover 3 covers an opening at the rear end of the motor compartment 21. The rear cover 3 is fastened to the motor compartment 21 with two screws 3S.

The motor compartment 21 has inlets 19. The rear cover 3 has outlets 20. Air outside the housing 2 flows into an internal space of the housing 2 through the inlets 19. Air inside the housing 2 flows out of the housing 2 through the outlets 20.

The hammer case 4 is formed from a metal. The hammer case 4 in the embodiment is formed from aluminum. The hammer case 4 is cylindrical. The hammer case 4 connects to a front portion of the motor compartment 21. A bearing box 24 is fixed to a rear portion of the hammer case 4. The bearing box 24 has a thread on its outer periphery. The hammer case 4 has a threaded groove on its inner periphery. The thread on the bearing box 24 is engaged with the threaded groove on the hammer case 4 to fasten the bearing box 24 and the hammer case 4 together. The hammer case 4 is held between the left housing 2L and the right housing 2R. The hammer case 4 is at least partially accommodated in the motor compartment 21. The bearing box 24 is fixed to the motor compartment 21 and the hammer case 4.

The hammer case 4 accommodates at least parts of the reducer 7, the spindle 8, the striker 9, and the anvil 10. The reducer 7 is located at least partially inside the bearing box 24. The reducer 7 includes multiple gears.

The hammer case 4 includes a first cylinder 401 and a second cylinder 402. The first cylinder 401 surrounds the striker 9. The second cylinder 402 is located frontward from the first cylinder 401. The second cylinder 402 has a smaller outer diameter than the first cylinder 401.

The hammer case cover 5 covers at least a part of the surface of the hammer case 4. The hammer case cover 5 protects the hammer case 4. The hammer case cover 5 reduces contact between the hammer case 4 and objects nearby.

The motor 6 is a power source for the impact tool 1. The motor 6 is a brushless inner-rotor motor. The motor 6 includes a stator 26 and a rotor 27. The stator 26 is supported on the motor compartment 21. The rotor 27 is located at least partially inside the stator 26. The rotor 27 rotates relative to the stator 26. The rotor 27 rotates about the rotation axis AX extending in the front-rear direction.

The stator 26 includes a stator core 28, a front insulator 29, a rear insulator 30, and coils 31.

The stator core 28 is located radially outside the rotor 27. The stator core 28 includes multiple steel plates stacked on one another. The steel plates are metal plates formed from iron as a main component. The stator core 28 is cylindrical. The stator core 28 includes multiple teeth to support the coils 31.

The front insulator 29 is located on the front of the stator core 28. The rear insulator 30 is located on the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 between them. The stator 26 includes multiple coils 31. The coils 31 surround the teeth on the stator core 28 with the front insulator 29 and the rear insulator 30 between them. The coils 31 and the stator core 28 are electrically insulated from each other with the front insulator 29 and the rear insulator 30. The coils 31 are connected to one another with fusing terminals 38.

The rotor 27 rotates about the rotation axis AX. The rotor 27 includes a rotor core 32, a rotor shaft 33, a rotor magnet 34, and a sensor magnet 35.

The rotor core 32 and the rotor shaft 33 are formed from steel. The rotor shaft 33 protrudes from the end faces of the rotor core 32 in the front-rear direction. The rotor shaft 33 includes a front shaft portion 33F and a rear shaft portion 33R. The front shaft portion 33F protrudes frontward from the front end face of the rotor core 32. The rear shaft portion 33R protrudes rearward from the rear end face of the rotor core 32.

The rotor magnet 34 is fixed to the rotor core 32. The rotor magnet 34 is cylindrical. The rotor magnet 34 surrounds the rotor core 32.

The sensor magnet 35 is fixed to the rotor core 32. The sensor magnet 35 is annular. The sensor magnet 35 is located on the front end face of the rotor core 32 and the front end face of the rotor magnet 34.

A sensor board 37 is attached to the front insulator 29. The sensor board 37 is fastened to the front insulator 29 with a screw 29S. The sensor board 37 includes a circular circuit board with a hole at the center, and a rotation detector supported by the circuit board. The sensor board 37 at least partially faces the sensor magnet 35. The rotation detector detects the position of the sensor magnet 35 on the rotor 27 to detect the position of the rotor 27 in the rotation direction.

The rotor shaft 33 is supported by a rotor bearing 39 to allow rotation. The rotor bearing 39 includes a front rotor bearing 39F and a rear rotor bearing 39R. The front rotor bearing 39F supports the front shaft portion 33F to allow rotation. The rear rotor bearing 39R supports the rear shaft portion 33R to allow rotation.

The front rotor bearing 39F is held by the bearing box 24. The bearing box 24 has a recess 24A. The recess 24A is recessed frontward from the rear surface of the bearing box 24. The front rotor bearing 39F is received in the recess 24A. The rear rotor bearing 39R is held by the rear cover 3. The front end of the rotor shaft 33 is located inside the hammer case 4 through an opening of the bearing box 24.

A pinion gear 41 is located on the front end of the rotor shaft 33. The pinion gear 41 is connected to at least a part of the reducer 7. The rotor shaft 33 is connected to the reducer 7 with the pinion gear 41 in between.

The reducer 7 is located frontward from the motor 6. The reducer 7 connects the rotor shaft 33 and the spindle 8 together. The reducer 7 transmits rotation of the rotor 27 to the spindle 8. The reducer 7 rotates the spindle 8 at a lower rotational speed than the rotor shaft 33. The reducer 7 includes a planetary gear assembly.

The reducer 7 includes multiple gears. The rotor 27 drives the gears in the reducer 7.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4.

Each planetary gear 42 meshes with the pinion gear 41. The planetary gears 42 are supported by the spindle 8 with a pin 42P in between to allow rotation of the planetary gears 42. The spindle 8 is rotated by the planetary gears 42. The internal gear 43 includes internal teeth that mesh with the planetary gears 42. The internal gear 43 is fixed to the hammer case 4. The internal gear 43 is constantly nonrotatable relative to the hammer case 4.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The spindle 8, which is connected to the planetary gears 42 with the pin 42P in between, rotates at a lower rotational speed than the rotor shaft 33.

The spindle 8 is located frontward from at least a part of the motor 6. The spindle 8 is located frontward from the stator 26. The spindle 8 is located at least partially frontward from the rotor 27. The spindle 8 is located at least partially in front of the reducer 7. The spindle 8 is located behind the anvil 10. The spindle 8 is rotated by the rotor 27. The spindle 8 rotates with a rotational force from the rotor 27 transmitted by the reducer 7. The spindle 8 transmits a rotational force from the motor 6 to the anvil 10 with balls 48 and a hammer 47 between them.

The spindle 8 includes a flange 8A and a spindle shaft 8B. The spindle shaft 8B protrudes frontward from the flange 8A. The planetary gears 42 are supported by the flange 8A with the pin 42P in between to allow rotation of the planetary gears 42. The rotation axis of the spindle 8 aligns with the rotation axis AX of the motor 6. The spindle 8 rotates about the rotation axis AX. The spindle 8 is supported by a spindle bearing 44 to allow rotation. The spindle 8 includes a protrusion 8C on its rear end. The protrusion 8C protrudes rearward from the flange 8A. The protrusion 8C surrounds the spindle bearing 44.

The bearing box 24 at least partially surrounds the spindle 8. The spindle bearing 44 is held by the bearing box 24. The bearing box 24 includes a protrusion 24B. The protrusion 24B protrudes frontward from the front surface of the bearing box 24. The spindle bearing 44 surrounds the protrusion 24B.

The striker 9 is driven by the motor 6. A rotational force from the motor 6 is transmitted to the striker 9 through the reducer 7 and the spindle 8. The striker 9 strikes the anvil 10 in the rotation direction in response to the rotational force of the spindle 8 rotated by the motor 6. The striker 9 includes the hammer 47, the balls 48, a first coil spring 49, a second coil spring 50, a third coil spring 51, a first washer 52, and a second washer 53. The striker 9, including the hammer 47, the balls 48, the first coil spring 49, the second coil spring 50, the third coil spring 51, the first washer 52, and the second washer 53, is accommodated in the first cylinder 401 in the hammer case 4.

The hammer 47 is located frontward from the reducer 7. The hammer 47 surrounds the spindle 8. The hammer 47 is held by the spindle 8. The balls 48 are located between the spindle 8 and the hammer 47. The hammer 47 includes a cylindrical hammer body 47D and hammer protrusions 47E. The hammer protrusions 47E are located at the front of the hammer body 47D. The hammer body 47D includes an annular recess 47C on the rear surface. The recess 47C is recessed frontward from the rear surface of the hammer body 47D.

The hammer 47 surrounds the spindle shaft 8B. The hammer 47 has a hole 47A receiving the spindle shaft 8B.

The hammer 47 is rotated by the motor 6. A rotational force from the motor 6 is transmitted to the hammer 47 through the reducer 7 and the spindle 8. The hammer 47 is rotatable together with the spindle 8 in response to the rotational force of the spindle 8 rotated by the motor 6. The rotation axis of the hammer 47 and the rotation axis of the spindle 8 align with the rotation axis AX of the motor 6. The hammer 47 rotates about the rotation axis AX.

The first washer 52 is received in the recess 47C. The first washer 52 is supported by the hammer 47 with multiple balls 54 in between. The balls 54 are located frontward from the first washer 52.

The second washer 53 is located rearward from the first washer 52 inside the recess 47C. The second washer 53 has a smaller outer diameter than the first washer 52. The second washer 53 and the hammer 47 are movable relative to each other in the front-rear direction.

The first coil spring 49 surrounds the spindle shaft 8B. The rear end of the first coil spring 49 is supported by the flange 8A. The front end of the first coil spring 49 is received in the recess 47C and supported by the first washer 52. The first coil spring 49 constantly generates an elastic force for moving the hammer 47 forward.

The second coil spring 50 surrounds the spindle shaft 8B. The second coil spring 50 is located radially inward from the first coil spring 49. The rear end of the second coil spring 50 is supported by the flange 8A. The front end of the second coil spring 50 is received in the recess 47C and supported by the second washer 53. The second coil spring 50 generates an elastic force for moving the hammer 47 forward when the hammer 47 moves backward.

The third coil spring 51 surrounds the spindle shaft 8B. The third coil spring 51 is located radially inward from the first coil spring 49. The third coil spring 51 is received in the recess 47C. The rear end of the third coil spring 51 is supported by the second washer 53. The front end of the third coil spring 51 is supported by the first washer 52. The third coil spring 51 generates an elastic force for moving the second coil spring 50 backward. Thus, the rear end of the second coil spring 50 is pressed against the flange 8A. This restricts free movement of the second coil spring 50 relative to the flange 8A.

The balls 48 are formed from a metal such as steel. The balls 48 are located between the spindle shaft 8B and the hammer 47. The spindle 8 has a spindle groove 8D receiving at least parts of the balls 48. The spindle groove 8D is on the outer surface of the spindle shaft 8B. The hammer 47 has a hammer groove 47B receiving at least parts of the balls 48. The hammer groove 47B is on the inner surface of the hammer 47. The balls 48 are located between the spindle groove 8D and the hammer groove 47B. The balls 48 roll along the spindle groove 8D and the hammer groove 47B. The hammer 47 is movable together with the balls 48. The spindle 8 and the hammer 47 move relative to each other in the axial and rotation directions within a movable range defined by the spindle groove 8D and the hammer groove 47B.

The anvil 10 is located frontward from the motor 6. The anvil 10 is an output unit of the impact tool 1 that rotates in response to the rotational force of the rotor 27. The anvil 10 is located at least partially frontward from the hammer 47. The anvil 10 has a tool hole 10A to receive a tip tool. The anvil 10 has the tool hole 10A at its front end. The tip tool is attached to the anvil 10.

The anvil 10 includes an anvil protrusion 10B. The anvil protrusion 10B is located at the rear end of the anvil 10. The anvil protrusion 10B protrudes rearward from the rear end of the anvil 10. The spindle 8 is located behind the anvil 10. The spindle shaft 8B has a spindle recess 8E at the front end. The spindle recess 8E receives the anvil protrusion 10B.

The anvil 10 includes a rod-like anvil shaft 101 and an anvil projection 102. The tool hole 10A is located at the front end of the anvil shaft 101. The tip tool is attached to the anvil shaft 101. The anvil projection 102 is located on the rear end of the anvil 10. The anvil projection 102 protrudes radially outward from the rear end of the anvil shaft 101.

The anvil 10 is supported by bearings 46 to allow rotation. The rotation axis of the anvil 10 aligns with the rotation axis of the hammer 47, the rotation axis of the spindle 8, and the rotation axis AX of the motor 6. The anvil 10 rotates about the rotation axis AX. The bearings 46 surround the anvil shaft 101. The bearings 46 are located inside the second cylinder 402 in the hammer case 4. The bearings 46 are held in the second cylinder 402 in the hammer case 4. The bearings 46 support the front of the anvil shaft 101 to allow rotation. O-rings 45 are located between the bearings 46 and the anvil shaft 101.

The anvil 10 in the embodiment is supported by two bearings 46 arranged in the axial direction. The two bearings 46 are hereafter referred to as a bearing 46A and a bearing 46B as appropriate. The bearing 46A is located frontward from the bearing 46B.

In the embodiment, two O-rings 45 are located in the axial direction between the bearings 46 and the anvil shaft 101. The two O-rings 45 are hereafter referred to as an O-ring 45A and an O-ring 45B as appropriate. The O-ring 45A is located frontward from the O-ring 45B. The O-ring 45A is located between the bearing 46A and the anvil shaft 101. The O-ring 45B is located between the bearing 46B and the anvil shaft 101.

The hammer 47 can at least partially come in contact with the anvil projection 102. The hammer 47 includes the hammer protrusions 47E at the front. The hammer protrusions 47E protrude frontward. The hammer protrusions 47E and the anvil projection 102 can come in contact with each other. When the motor 6 operates, with the hammer 47 and the anvil projection 102 in contact with each other, the anvil 10 rotates together with the hammer 47 and the spindle 8.

The anvil 10 is struck by the hammer 47 in the rotation direction. When, for example, the anvil 10 receives a higher load in a screwing operation, the anvil 10 may fail to rotate with the load from the first coil spring 49 alone. In this state, the anvil 10 and the hammer 47 stop rotating. The spindle 8 and the hammer 47 are movable relative to each other in the axial and circumferential directions with the balls 48 in between. Although the hammer 47 stops rotating, the spindle 8 continues to rotate with power generated by the motor 6. When the hammer 47 stops rotating and the spindle 8 continues to rotate, the balls 48 move backward as being guided along the spindle groove 8D and the hammer groove 47B. The hammer 47 receives a force from the balls 48 to move backward with the balls 48. In other words, the hammer 47 moves backward when the anvil 10 stops rotating and the spindle 8 rotates. Thus, the hammer 47 and the anvil projection 102 are out of contact from each other.

As described above, the first coil spring 49 constantly generates an elastic force for moving the hammer 47 forward. The second coil spring 50 generates an elastic force for moving the hammer 47 forward after the hammer 47 moves backward from a predetermined position. The hammer 47 moving rearward then moves forward under the elastic force from the first coil spring 49 and the second coil spring 50. When moving forward, the hammer 47 receives a force in the rotation direction from the balls 48. In other words, the hammer 47 moves forward while rotating. In this case, the hammer 47 comes in contact with the anvil projection 102 while rotating. Thus, the anvil projection 102 is struck by the hammer protrusions 47E on the hammer 47 in the rotation direction. The anvil 10 receives power from the motor 6 and the inertial force from the hammer 47. The anvil 10 thus rotates with high torque about the rotation axis AX.

The tool holder 11 surrounds a front portion of the anvil 10. The tool holder 11 holds a tip tool received in the tool hole 10A in the anvil 10. The tip tool is attachable to and detachable from the tool holder 11.

The tool holder 11 includes balls 71, a leaf spring 72, a sleeve 73, a coil spring 74, and a positioner 75.

The anvil 10 has supporting recesses 76 supporting the balls 71. The supporting recesses 76 are located on the outer surface of the anvil shaft 101. In the embodiment, two supporting recesses 76 are located on the anvil shaft 101.

The balls 71 are supported on the anvil 10 in a movable manner. The balls 71 are received in the supporting recesses 76. The single ball 71 is received in the single supporting recess 76.

The anvil shaft 101 has a through-hole connecting the inner surface of the supporting recesses 76 and the inner surface of the tool hole 10A. The ball 71 has a smaller diameter than the through-hole. The balls 71 supported in the supporting recess 76 are received at least partially in the tool hole 10A. The balls 71 fasten a tip tool received in the tool hole 10A. The balls 71 are movable between an engagement position and a release position. The balls 71 fasten the tip tool at the engagement position and release the fastened tip tool at the release position.

The leaf spring 72 generates an elastic force for moving the balls 71 to the engagement position. The leaf spring 72 surrounds the anvil shaft 101. The leaf spring 72 generates an elastic force for moving the balls 71 forward.

The sleeve 73 is cylindrical. The sleeve 73 surrounds the anvil shaft 101. The sleeve 73 is movable in the axial direction around the anvil shaft 101. The sleeve 73 restricts the balls 71 at the engagement position from coming out of the engagement position. The sleeve 73 moves in the axial direction to permit the balls 71 to be movable from the engagement position to the release position.

The sleeve 73 is movable between a movement-restricting position and a movement-permitting position around the anvil shaft 101. At the movement-restricting position, the sleeve 73 restricts radially outward movement of the balls 71. At the movement-permitting position, the sleeve 73 permits radially outward movement of the balls 71.

The sleeve 73 at the movement-restricting position restricts the balls 71 at the engagement position from moving radially outward. In other words, the sleeve 73 at the movement-restricting position restricts the balls 71 at the engagement position from coming out of the engagement position. Thus, the tip tool remains fastened by the balls 71.

The sleeve 73 moves to the movement-permitting position to permit the balls 71 at the engagement position to move radially outward. The sleeve 73 moves to the movement-permitting position to permit the balls 71 to move from the engagement position to the release position. In other words, the sleeve 73 at the movement-permitting position permits the balls 71 to come out of the engagement position. This causes the tip tool fastened by the balls 71 to be unfastened.

The coil spring 74 generates an elastic force for moving the sleeve 73 to the movement-restricting position. The coil spring 74 surrounds the anvil shaft 101. The movement-restricting position is defined rearward from the movement-permitting position. The coil spring 74 generates an elastic force for moving the sleeve 73 backward.

The positioner 75 is annular and is fixed on an outer surface of the anvil shaft 101. The positioner 75 is fixed to face the rear end of the sleeve 73. The positioner 75 positions the sleeve 73 at the movement-restricting position. The sleeve 73 under an elastic force from the coil spring 74 for moving backward comes in contact with the positioner 75 and is positioned at the movement-restricting position.

The fan 12 is located rearward from the stator 26 in the motor 6. The fan 12 generates an airflow for cooling the motor 6. The fan 12 is fastened to at least a part of the rotor 27. The fan 12 is fastened to the rear of the rear shaft portion 33R with a bush 12A. The fan 12 is located between the rear rotor bearing 39R and the stator 26. The fan 12 rotates as the rotor 27 rotates. As the rotor shaft 33 rotates, the fan 12 rotates together with the rotor shaft 33. Thus, air outside the housing 2 flows into the internal space of the housing 2 through the inlets 19. Air flowing into the internal space of the housing 2 flows through the internal space of the housing 2 and thus cools the motor 6. The air then flows out of the housing 2 through the outlets 20.

The battery mount 13 is located in a lower portion of the battery holder 23. The battery mount 13 is connected to a battery pack 25. The battery pack 25 is attached to the battery mount 13 in a detachable manner. The battery pack 25 is inserted into the battery mount 13 from the front of the battery holder 23 and is thus attached to the battery mount 13. The battery pack 25 is pulled forward along the battery mount 13 and is thus removed from the battery mount 13. The battery pack 25 includes a secondary battery. The battery pack 25 in the embodiment includes a rechargeable lithium-ion battery. The battery pack 25 is attached to the battery mount 13 to power the impact tool 1. The motor 6 is driven by power supplied from the battery pack 25. The operation display 16 is operated by power supplied from the battery pack 25.

The trigger lever 14 is located on the grip 22. The trigger lever 14 activates the motor 6. The trigger lever 14 is operated by the operator to switch the motor 6 between the driving state and the stopped state.

The forward-reverse switch lever 15 is located in the upper portion of the grip 22. The forward-reverse switch lever 15 is operable by the operator. The forward-reverse switch lever 15 is operated to switch the rotation direction of the motor 6 between forward and reverse. This operation switches the rotation direction of the spindle 8.

The operation display 16 is located in the battery holder 23. The operation display 16 is located on the upper surface of the battery holder 23 frontward from the grip 22. The operation display 16 includes multiple operation buttons 16A and an indicator 16B. The operation buttons 16A are operable by the operator to change the operational mode of the motor 6. The indicator 16B includes multiple light emitters. The indicator 16B indicates the operating mode of motor 6 by changing the lighting pattern of the multiple light emitters.

The mode switch 17 is located above the trigger lever 14. The mode switch 17 changes the operational mode of the motor 6.

The light assembly 18 emits illumination light. The light assembly 18 illuminates the anvil 10 and an area around the anvil 10 with illumination light. The light assembly 18 illuminates an area ahead of the anvil 10 with illumination light. The light assembly 18 also illuminates a tip tool attached to the anvil 10 and an area around the tip tool with illumination light. The light assembly 18 in the embodiment includes an annular base member 18A and multiple light-emitting devices 18B. The multiple light-emitting devices 18B are held on the base member 18A. The base member 18A surrounds the second cylinder 402 in the hammer case 4. The light assembly 18 also includes a ring member 18C. The ring member 18C reduces moving of the base member 18A forward from the second cylinder 402.

Ring Member and Stopper

Figure 5:
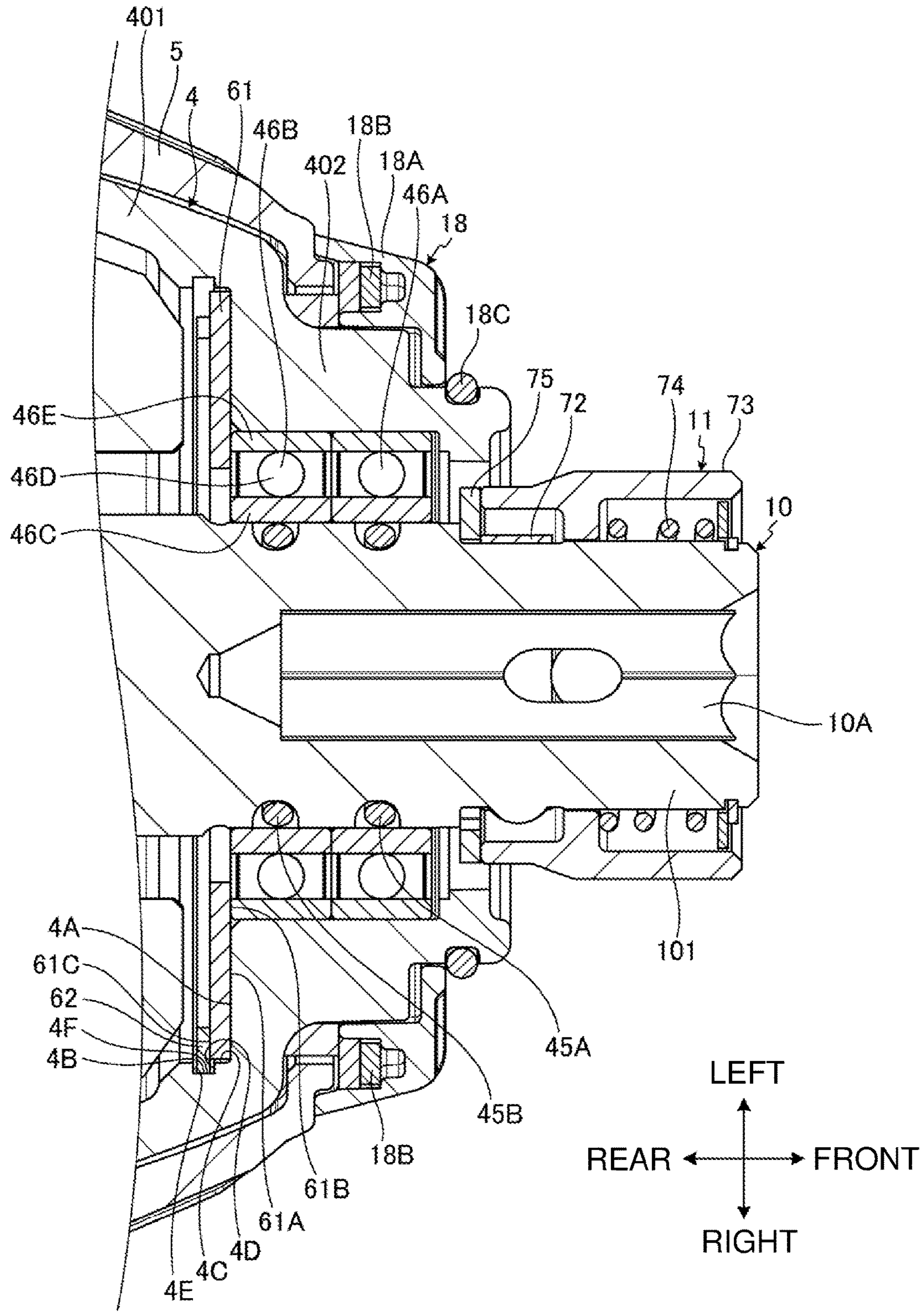
FIG. 5 is a partially enlarged view of FIG. 4.
Figure 6:
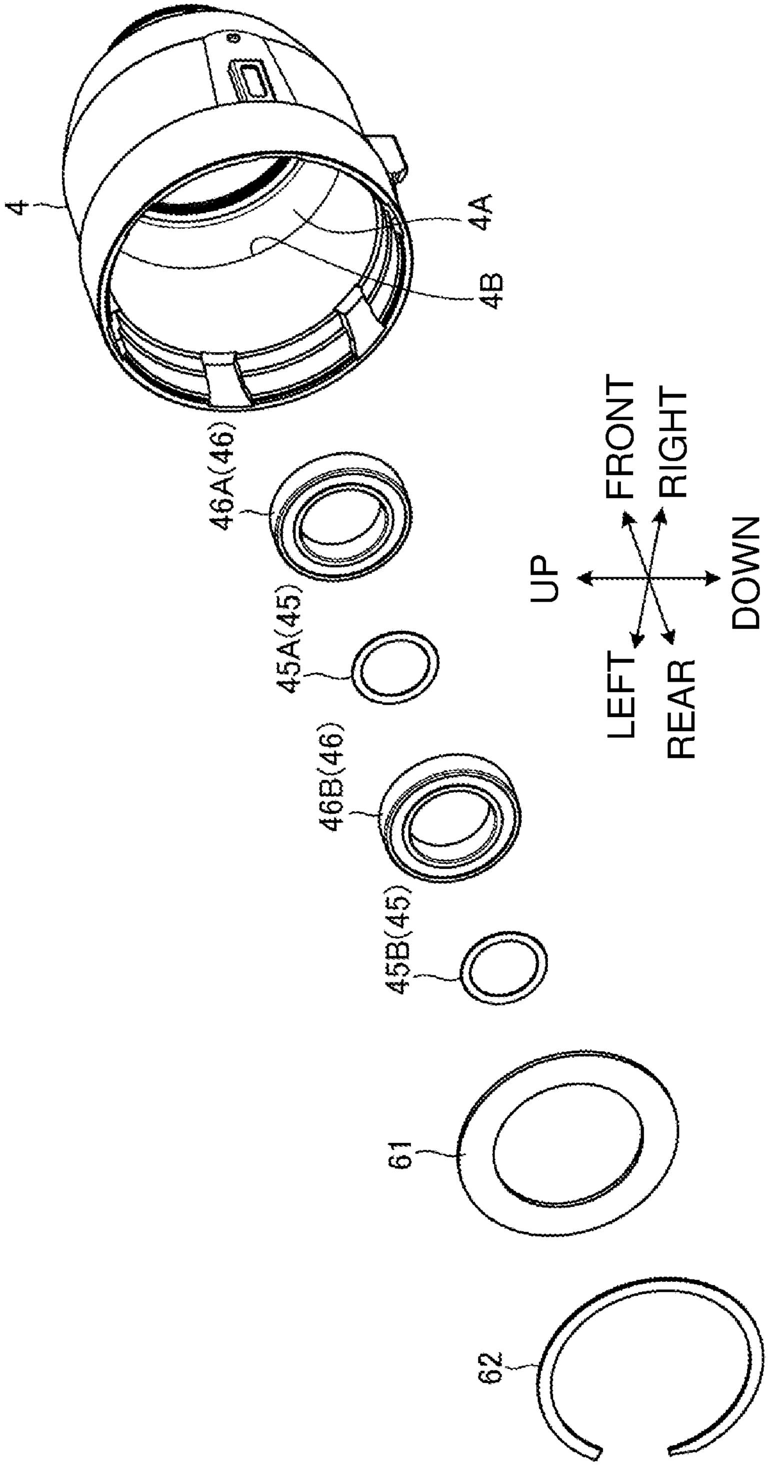
FIG. 6 is a partially exploded perspective view of the impact tool according to the embodiment.

FIG. 5 is a partially enlarged view of FIG. 4. FIG. 6 is an exploded perspective view of the impact tool 1 according to the embodiment.

As shown in FIGS. 3 to FIG. 6, the impact tool 1 includes the hammer case 4, the bearings 46, the O-rings 45, a ring member 61, and a stopper 62.

The hammer case 4 includes the first cylinder 401 and the second cylinder 402. The first cylinder 401 surrounds the striker 9. The second cylinder 402 is located frontward from the first cylinder 401. The second cylinder 402 has a larger outer diameter than the first cylinder 401. The bearings 46 are held by the hammer case 4. The bearings 46 are located at least partially inside the second cylinder 402 in the hammer case 4.

The bearings 46 surround the anvil shaft 101. The O-rings 45 are located between the outer periphery of the anvil shaft 101 and the inner peripheries of the bearings 46. The O-rings 45 are in contact with the outer periphery of the anvil shaft 101 and the inner peripheries of the bearings 46. The bearings 46 support the anvil shaft 101 to allow rotation. As described above, the hammer case 4 holds the two bearings 46 that are arranged in the front-rear direction. The two O-rings 45 in the front-rear direction are located between the outer periphery of the anvil shaft 101 and the inner periphery of each bearing 46. The bearings 46 include the bearing 46A and the bearing 46B. The bearing 46B is located rearward from the bearing 46A. The O-rings 45 include the O-ring 45A and the O-ring 45B. The O-ring 45B is located rearward from the O-ring 45A. The O-ring 45A is located between the bearing 46A and the anvil shaft 101. The O-ring 45B is located between the bearing 46B and the anvil shaft 101.

The bearings 46 are ball bearings. Each of the bearings 46A and 46B includes an inner ring 46C, balls 46D, and an outer ring 46E. The inner ring 46C in the bearing 46A is in contact with the O-ring 45A. The inner ring 46C in the bearing 46B is in contact with the O-ring 45B. The balls 46D are located between the inner ring 46C and the outer ring 46E in the radial direction. The balls 46D are in contact with the inner ring 46C and the outer ring 46E. Multiple balls 46D are arranged circumferentially. The outer ring 46E is located radially outward from the inner ring 46C and the balls 46D. The outer ring 46E in the bearing 46A is in contact with the inner peripheral surface of the second cylinder 402. The outer ring 46E in the bearing 46B is in contact with the inner peripheral surface of the second cylinder 402.

The ring member 61 is annular. The ring member 61 is formed from a metal. The metal for the ring member 61 is, for example, iron. The front surface and the rear surface of the ring member 61 are flat.

The ring member 61 is located between the anvil projection 102 and the rear bearing 46B in the front-rear direction. The bearing 46B is located frontward from the ring member 61. The anvil projection 102 is located rearward from the ring member 61. The rear surface of the ring member 61 at least partially faces the front surface of the anvil projection 102. The front surface of the ring member 61 is at least partially in contact with the rear end face of the rear bearing 46B.

The stopper 62 engages with each of the hammer case 4 and the ring member 61. The stopper 62 reduces moving of the ring member 61 rearward. The stopper 62 is, for example, a snap ring or a C-ring. The stopper 62 is in contact with the ring member 61.

The hammer case 4 includes a support surface 4A and an inner peripheral surface 4C. The support surface 4A faces at least a part of the front surface of the ring member 61. The inner peripheral surface 4C faces the outer peripheral surface of the ring member 61. The support surface 4A of the hammer case 4 and the rear end face of the rear bearing 46B are substantially in the same plane. At least a part of the ring member 61 is located between the front surface of the anvil projection 102 and the support surface 4A of the hammer case 4.

The ring member 61 reduces contact between the hammer case 4 and the anvil projection 102.

The front surface of the ring member 61 is at least partially in contact with the support surface 4A of the hammer case 4. Also, the front surface of the ring member 61 is at least partially in contact with the rear end face of the rear bearing 46B.

As shown in FIG. 5, a front outer edge 61A, which defines an outer edge of the front surface of the ring member 61, is in contact with the support surface 4A of the hammer case 4. The outer peripheral surface of the ring member 61 can come in contact with the inner peripheral surface 4C of the hammer case 4. A front inner edge 61B, which defines an inner edge of the front surface of the ring member 61, can come in contact with the rear end face of the outer ring 46E in the bearing 46B. The ring member 61 is located radially outward from the inner ring 46C of the bearing 46B. The ring member 61 is not in contact with the inner ring 46C in the bearing 46B.

A rear outer edge 61C, which defines an outer edge of the rear surface of the ring member 61, is in contact with the stopper 62.

The inner surface of the first cylinder 401 in the hammer case 4 includes a groove 4B that receives at least a part of the stopper 62. The hammer case 4 includes a first support surface 4D, a second support surface 4E, and an inner peripheral surface 4F. The first support surface 4D connects to the rear end of the inner peripheral surface 4C. The second support surface 4E is located rearward from the first support surface 4D. The first support surface 4D faces rearward. The first support surface 4D is located radially outward from the inner peripheral surface 4C. The second support surface 4E faces frontward. The second support surface 4E faces the first support surface 4D. The inner peripheral surface 4F connects a radially outward end of the first support surface 4D with a radially outward end of the second support surface 4E. The first support surface 4D can face the outer edge of the front surface of the stopper 62. The second support surface 4E can face the outer edge of the rear surface of the stopper 62. The inner peripheral surface 4F can face the outer peripheral surface of the stopper 62. The groove 4B is defined by the first support surface 4D, the second support surface 4E, and the inner peripheral surface 4F. The stopper 62 received in the groove 4B reduces changes in the relative positions between the hammer case 4 and the stopper 62 at least in the axial direction.

The ring member 61 and the stopper 62 reduce moving of the bearings 46 rearward (in the second axial direction).

As shown in FIG. 3, a front outer edge 102A, which defines an outer edge of the front surface of the anvil projection 102, slopes rearward and radially outward.

In the front-rear direction, the stopper 62 is located between the front outer edge 102A of the anvil projection 102 and the rear outer edge 61C of the ring member 61.

Operation of Impact Tool

The operation of the impact tool 1 will now be described. To perform, for example, a screwing operation on a workpiece, a tip tool (screwdriver bit) for the screwing operation is placed into the tool hole 10A in the anvil 10. The tip tool in the tool hole 10A is held by the tool holder 11. After the tip tool is attached to the anvil 10, the operator grips the grip 22 with, for example, a right hand and pulls the trigger lever 14 with a right index finger. Power is then supplied from the battery pack 25 to the motor 6 to activate the motor 6 and turn on the light assembly 18 simultaneously. As the motor 6 is activated, the rotor shaft 33 in the rotor 27 rotates. The rotational force of the rotor shaft 33 is then transmitted to the planetary gears 42 through the pinion gear 41. The planetary gears 42 revolve about the pinion gear 41 while rotating and meshing with the internal teeth on the internal gear 43. The planetary gears 42 are supported by the spindle 8 with the pin 42P in between to allow rotation of the planetary gears 42. The revolving planetary gears 42 rotate the spindle 8 at a lower rotational speed than the rotor shaft 33.

When the spindle 8 rotates with the hammer 47 and the anvil projection 102 in contact with each other, the anvil 10 rotates together with the hammer 47 and the spindle 8. Thus, the screw fastening operation proceeds.

When the anvil 10 receives a predetermined or higher load as the screw fastening operation proceeds, the anvil 10 and the hammer 47 stop rotating. When the spindle 8 rotates in this state, the hammer 47 moves backward. Thus, the hammer 47 and the anvil projection 102 are out of contact from each other. The hammer 47 moving backward then moves forward while rotating under an elastic force from the first coil spring 49 and the second coil spring 50. Thus, the anvil 10 is struck by the hammer 47 in the rotation direction. The anvil 10 thus rotates about the rotation axis AX at high torque. The screw is thus fastened to the workpiece under high torque.

As described above, the impact tool 1 according to the embodiment includes the motor 6, the striker 9 drivable by the motor 6, the anvil 10 including the anvil shaft 101 to receive the tip tool, and the anvil projection 102 protruding radially outward from the rear end of the anvil shaft 101 to be struck by the striker 9 in the rotation direction, the hammer case 4 accommodating the striker 9, the bearing 46 held in the hammer case 4 and surrounding the anvil shaft 101, the ring member 61 at least partially facing the front surface of the anvil projection 102 and in contact with the rear end face of the bearing 46, and the stopper 62 engaging with the hammer case 4 and the ring member 61 to reduce moving of the ring member 61 rearward.

In the above structure, the ring member 61 is in contact with the rear end face of the bearing 46, which is supported on the ring member 61. The stopper 62 reduces moving of the ring member 61 rearward. The bearing 46 is supported by the stopper 62 with the ring member 61 in between. This structure reduces moving of the bearing 46 rearward. The bearing 46 is supported on the ring member 61. The ring member 61 is supported on the stopper 62. This structure reduces an increase in the size of the impact tool 1. This particularly reduces an increase in the dimensions of the upper part of the impact tool 1 in the axial direction parallel to the rotation axis AX of the motor 6. For example, this structure reduces an increase in the axial length indicating the distance between the rear end face of the rear cover 3 and the front end face of the anvil shaft 101.

The hammer case 4 in the embodiment includes the support surface 4A facing at least a part of the front surface of the ring member 61. At least a part of the ring member 61 is located between the front surface of the anvil projection 102 and the support surface 4A of the hammer case 4.

In the above structure, the ring member 61 is supported between the support surface 4A of the hammer case 4 and the stopper 62 in the front-rear direction. This restricts the ring member 61 from moving relative to the hammer case 4. The bearing 46 is stably supported by the ring member 61.

The ring member 61 in the embodiment reduces contact between the hammer case 4 and the anvil projection 102.

In the above structure, the ring member 61 located between the hammer case 4 and the anvil projection 102 reduces contact between the hammer case 4 and the anvil projection 102.

In the embodiment, at least a part of the front surface of the ring member 61 is in contact with the support surface 4A of the hammer case 4.

This structure allows the front surface of the ring member 61 to be in direct contact with the support surface 4A of the hammer case 4, thus reducing an increase in the size of the impact tool 1 in the axial direction. In other words, this structure reduces an increase in the axial length.

In the embodiment, the ring member 61 includes the front outer edge 61A, which is the outer edge of the front face of the ring member 61, in contact with the support surface 4A of the hammer case 4, and the ring member 61 includes the front inner edge 61B, which is the inner edge of the front face of the ring member 61, in contact with the rear end face of the bearing 46.

This structure allows the support surface 4A of the hammer case 4 and the rear end face of the bearing 46 to be substantially in the same plane. The front surface of the ring member 61 is in contact with the support surface 4A of the hammer case 4 and the rear end face of the bearing 46. In this manner, the bearing 46 is stably supported by the ring member 61. This thus reduces an increase in the size of the impact tool 1 in the axial direction. In other words, this structure reduces an increase in the axial length.

In the embodiment, the ring member 61 includes the rear outer edge 61C, which is the outer edge of the rear surface of the ring member 61, in contact with the stopper 62.

This structure allows the rear surface of the ring member 61 to be in direct contact with the stopper 62, thus reducing an increase in the size of the impact tool 1 in the axial direction. In other words, this structure reduces an increase in the axial length.

In the embodiment, the hammer case 4 includes the inner surface including the groove 4B receiving at least a part of the stopper 62.

This reduces changes in the relative positions between the hammer case 4 and the stopper 62 in the axial direction.

In the embodiment, the stopper 62 is located between the front outer edge 102A, which is the outer edge of the front surface of the anvil projection 102, and the rear outer edge 61C of the ring member 61 in the front-rear direction.

The stopper 62 between the anvil projection 102 and the ring member 61 reduces contact between the anvil projection 102 and the ring member 61.

In the embodiment, the front outer edge 102A of the anvil projection 102 slopes rearward and radially outward.

This structure reduces contact between the front outer edge 102A of the anvil projection 102 and the stopper 62.

The hammer case 4 in the embodiment includes the first cylinder 401 surrounding the striker 9, and the second cylinder 402 located frontward from the first cylinder 401 and having a smaller outer diameter than the first cylinder 401. The bearing 46 is held in the second cylinder 402.

This allows the bearing 46 to be stably held in the second cylinder 402.

Modifications

In the above embodiment, the impact tool 1 is an impact driver. The impact tool 1 may be an impact wrench.

In the above embodiment, the impact tool 1 may use utility power (alternating-current power supply) instead of the battery pack 25.

Reference Signs List

1 impact tool
2 housing
2L left housing
2R right housing
2S screw
3 rear cover
3S screw
4 hammer case
4A support surface
4B groove
4C inner peripheral surface
4D first support surface
4E second support surface
4F inner peripheral surface
5 hammer case cover
6 motor
7 reducer
8 spindle
8A flange
8B spindle shaft
8C protrusion
8D spindle groove
8E spindle recess
9 striker
10 anvil
10A tool hole
10B anvil protrusion
11 tool holder
12 fan
12A bush
13 battery mount
14 trigger lever
15 forward-reverse switch lever
16 operation display
16A operation button
16B indicator
17 mode switch
18 light assembly
18A base member
18B light-emitting device
18C ring member
19 inlet
20 outlet
21 motor compartment
22 grip
23 battery holder
24 bearing box
24A recess
24B protrusion
25 battery pack
26 stator
27 rotor
28 stator core
29 front insulator

29S screw
30 rear insulator
31 coil
32 rotor core
33 rotor shaft
33F front shaft portion
33R rear shaft portion
34 rotor magnet
35 sensor magnet
37 sensor board
38 fusing terminal
39 rotor bearing
39F front rotor bearing
39R rear rotor bearing
41 pinion gear
42 planetary gear
42P pin
43 internal gear
44 spindle bearing
45 O-ring
45A O-ring
45B O-ring
46 bearing
46A bearing
46B bearing
46C inner ring
46D ball
46E outer ring
47 hammer
47A hole
47B hammer groove
47C recess
47D hammer body
47E hammer protrusion
48 ball
49 first coil spring
50 second coil spring
51 third coil spring
52 first washer
53 second washer
54 ball
61 ring member
61A front outer edge
61B front inner edge
61C rear outer edge
62 stopper
71 ball
72 leaf spring
73 sleeve
74 coil spring
75 positioner
76 supporting recess
101 anvil shaft
102 anvil projection
102A front outer edge
401 first cylinder
402 second cylinder
AX rotation axis

What is claimed is:

1. An impact tool, comprising:

a motor;

a striker drivable by the motor;

an anvil including an anvil shaft to receive a tip tool, and an anvil projection protruding radially outward from a rear end of the anvil shaft to be struck by the striker in a rotation direction;

a hammer case accommodating the striker;

a bearing held in the hammer case and surrounding the anvil shaft, the bearing including, an inner ring, and an outer ring located radially outward from the inner ring;

a ring member at least partially facing a front surface of the anvil projection, the ring member being in direct contact with a rear end face of the outer ring without being in direct contact with a rear end face of the inner ring; and a stopper engaging with the hammer case and the ring member to reduce moving of the ring member rearward.

2. The impact tool according to claim 1, wherein the hammer case includes a support surface facing at least a part of a front surface of the ring member, and at least a part of the ring member is located between the front surface of the anvil projection and the support surface of the hammer case.

3. The impact tool according to claim 2, wherein the ring member reduces contact between the hammer case and the anvil projection.

4. The impact tool according to claim 3, wherein at least a part of the front surface of the ring member is in contact with the support surface of the hammer case.

5. The impact tool according to claim 3, wherein the ring member includes a front outer edge in contact with the support surface of the hammer case, and the ring member includes a front inner edge in contact with the rear end face of the bearing.

6. The impact tool according to claim 3, wherein the ring member includes a rear outer edge in contact with the stopper.

7. The impact tool according to claim 3, wherein the hammer case includes an inner surface including a groove receiving at least a part of the stopper.

8. The impact tool according to claim 2, wherein at least a part of the front surface of the ring member is in contact with the support surface of the hammer case.

9. The impact tool according to claim 8, wherein the ring member includes a front outer edge in contact with the support surface of the hammer case, and the ring member includes a front inner edge in contact with the rear end face of the bearing.

10. The impact tool according to claim 8, wherein the ring member includes a rear outer edge in contact with the stopper.

11. The impact tool according to claim 2, wherein the ring member includes a front outer edge in contact with the support surface of the hammer case, and the ring member includes a front inner edge in contact with the rear end face of the bearing.

12. The impact tool according to claim 11, wherein the ring member includes a rear outer edge in contact with the stopper.

13. The impact tool according to claim 2, wherein the ring member includes a rear outer edge in contact with the stopper.

14. The impact tool according to claim 2, wherein the hammer case includes an inner surface including a groove receiving at least a part of the stopper.

15. The impact tool according to claim 1, wherein the ring member includes a rear outer edge in contact with the stopper.

16. The impact tool according to claim 1, wherein the hammer case includes an inner surface including a groove receiving at least a part of the stopper.

17. The impact tool according to claim 1, wherein
the stopper is located between an outer edge of the front surface of the anvil projection and a rear outer edge of the ring member in a front-rear direction.

18. The impact tool according to claim 17, wherein
the outer edge of the front surface of the anvil projection slopes rearward and radially outward.

19. The impact tool according to claim 1, wherein
the hammer case includes
a first cylinder surrounding the striker, and
a second cylinder located frontward from the first cylinder and having a smaller outer diameter than the first cylinder, and
the bearing is held in the second cylinder.

20. An impact tool, comprising:
a motor;
a striker drivable by the motor;
an anvil including an anvil shaft to receive a tip tool, and an anvil projection protruding radially outward from a rear end of the anvil shaft to be struck by the striker in a rotation direction;
a hammer case accommodating the striker;
a bearing held in the hammer case and surrounding the anvil shaft;
a ring member at least partially facing a front surface of the anvil projection and in contact with a rear end face of the bearing; and
a stopper engaging with the hammer case and the ring member to reduce moving of the ring member rearward,
wherein
the ring member reduces contact between the hammer case and the anvil projection with the ring member being in direct contact with the anvil.

* * * * *